(12) United States Patent
Wang

(10) Patent No.: US 11,365,903 B2
(45) Date of Patent: Jun. 21, 2022

(54) INFLATABLE NON-IMAGING SOLAR CONCENTRATOR

(71) Applicant: Yonghua Wang, Klamath Falls, OR (US)

(72) Inventor: Yonghua Wang, Klamath Falls, OR (US)

(73) Assignee: Yonghua Wang (*) Notice: Subject to any disclaimer, the term of this patent is extended or adjusted under 35 U.S.C. 154(b) by 170 days.

(21) Appl. No.: 15/330,378

(22) Filed: Sep. 12, 2016

(65) Prior Publication Data

US 2018/0073772 A1 Mar. 15, 2018

(51) Int. Cl.
| | |
|---|---|
| *F24S 23/70* | (2018.01) |
| *F24S 20/50* | (2018.01) |
| *F24S 50/20* | (2018.01) |
| *F24S 80/52* | (2018.01) |
| *F24S 20/80* | (2018.01) |
| *F24S 80/525* | (2018.01) |

(52) U.S. Cl.
CPC .............. *F24S 20/50* (2018.05); *F24S 20/80* (2018.05); *F24S 23/80* (2018.05); *F24S 23/81* (2018.05); *F24S 50/20* (2018.05); *F24S 80/52* (2018.05); *F24S 80/525* (2018.05); *Y02E 10/47* (2013.01)

(58) Field of Classification Search
CPC ................................ F24S 20/20; F24S 23/745
See application file for complete search history.

(56) References Cited

U.S. PATENT DOCUMENTS

| | | | | |
|---|---|---|---|---|
| 4,114,592 A | * | 9/1978 | Winston | F24S 23/12 126/683 |
| 4,240,692 A | * | 12/1980 | Winston | F24S 23/00 385/146 |
| 4,541,414 A | * | 9/1985 | Mori | F21S 11/00 126/698 |
| 5,699,201 A | * | 12/1997 | Lee | G02B 19/0028 359/728 |
| 9,709,300 B2 | * | 7/2017 | Gu | F24J 2/02 |
| 2017/0324373 A1 | * | 11/2017 | Shanfelt | H02S 40/44 |

FOREIGN PATENT DOCUMENTS

| | | | | | |
|---|---|---|---|---|---|
| CN | 202058773 U | * | 11/2011 | | |
| GB | 2481401 A | * | 12/2011 | | H02S 20/32 |
| SU | 1746152 A1 | * | 7/1992 | | F24S 20/80 |

OTHER PUBLICATIONS

English translation of SU1746152A1. (Year: 1992).*

* cited by examiner

*Primary Examiner* — Charlie Y Peng

(57) ABSTRACT

An extremely low cost solar concentrator made of membranes or films is inflated into a Compound Parabolic Concentrator (CPC) a non-image concentrator. The portion of the inflatable concentrator, which is shaped into a CPC concentrator, is formed with reflective membranes or films, and the portions of the inflatable concentrator on the top of CPC and on the bottom of the concentrator are made of clear membranes or films. The incident light including parallel rays of light and diffuse light, as long as falling into the half acceptance angle of the CPC, will be concentrated to the bottom exit aperture of the CPC. Therefore, this type concentrator reduces the requirement to the accuracy of tracking for concentration. In addition, this type of concentrator demonstrates more tolerance to shape distortion for concentration than imaging system.

2 Claims, 2 Drawing Sheets

INFLATABLE NON-IMAGING SOLAR CONCENTRATOR

TECHNICAL FIELD

The present disclosure relates generally to solar concentrators, more specifically, to inflatable non-imaging solar concentrator.

BACKGROUND

Solar energy is clean, abundant and ubiquitously distributed over the world. It is widely accepted that solar energy is the most desirable energy resource and brings in the hope for the future of the world as the fossil fuel is depleting. For solar energy to be a main stream power supply supporting power grid, building, and transportation systems, solar collection and conversion systems with ultra-high efficiency and substantial low cost must be created and developed. Relative to other energy resources, the major issues of solar energy that cause low efficiency and high cost of solar systems stem from the low energy current density of solar radiation. Average solar radiation intensity on earth is around 800 W/m$^2$, varying with location, weather and season. When the flat plate photovoltaic panel is installed to intercept the sunlight, the large area semiconductor devices are directly employed to collect and convert the diffusive solar energy. Large area costly semiconductor makes the conventional solar system expensive. In order to reduce the area of semiconductor converter, usually large area solar concentrator is used to condense solar radiation before the converter is used to convert it into electric power. The relative low cost of solar concentrator substantially reduces the cost of solar collector. While, as the development of conventional silicon photovoltaic technology and the widely spread of adoption of flat plate photovoltaic systems, the fall of the cost of conventional silicon photovoltaic system makes any concentrating system un-plausible. The cost of flat plat silicon photovoltaic panel approaches the cost of conventional concentrating systems. However, the cost of the solar generated electricity is still way higher than fossil fuel generated electricity. The conventional flat plate photovoltaic technology has been pushed to its theoretical limits, there is no room to further dramatically reduce its cost and raise its efficiency. A new approach must be explored to extraordinarily reduce the cost of solar concentrator so that the trend of cost falling for solar power systems remains. Inflatable solar concentrator is able to concentrate sunlight using membranes or films and reflective coating with extremely low cost. Therefore, inflatable solar concentrator provides a path leading to extremely low cost solar power systems and radically reducing the cost of solar energy utilization.

U.S. Pat. No. 8,074,638 to Cummings disclosed an imaging inflatable solar concentrator consisting of an assembly made of at least a clear film and a reflective film that inflates into a shape reflecting parallel rays of light to a concentrated focus in the interior or immediate proximity of the assembly. Cummings's invention enables light concentration by using balloon type concentrator made of thin films. This innovation demonstrated potential to realize extremely low cost solar concentration. However, his system is only able to concentrate parallel rays of light not diffuse light, and needs precisely shaped balloon and high precision tracking.

U.S. Pat. No. 3,923,381 to Winston disclosed non-imaging systems and devices for collection and concentration of electromagnetic energy and particularly solar energy. Winston's disclosure realizes the concentration of solar energy without substantial diurnal tracking. The concentrator of his invention is formed by compounding two parabolic concentrators to form a structure that enables the different reflective surface areas of the concentrator take turn to reflect incident sunlight to concentrate it. The concentrator is referred as Compound Parabolic Concentrator (CPC). The axes of the two parabolic concentrators form an angle called acceptance angle θ max. The incidence light, no matter it is beam light or diffuse light, will be collected and concentrated to the exit aperture, as long as it falls into the acceptance angle. It means that as the sun is moving, the incident angle formed between the ray of incident sunlight and the axis of CPC is varying, but as long as the incident angle is smaller than the acceptance angle θ max, the incident sunlight will be collected and concentrated. For a design of CPC with certain θ max, the concentrator will operate in certain period of time during a day without tracking the sun. The concentration ratio of the concentrator is determined by θ max. The larger the θ max, the smaller the concentration ratio. For large θ max, the concentration ratio is a small number. For instance, with θ max=30°, the concentration ratio is 2 (refer to John Duffie & William Beckman, Solar Engineering of Thermal Processes, 3$^{rd}$ Edition, 2006, pp 340-347). For concentration ratio 100, θ max must be as small as 6° For practical application with tracking, the concentration ratio could be several hundreds and even more. It means that CPC non-imaging concentrator with high concentration ratio requires less tracking accuracy and works for both beam light and diffuse light. Winston's invention provides the basic non-imaging optics and principle of devices, but his device is open, it is not inflatable.

The objective of the present invention is to provide an inflatable non-imaging optical system or device that is able to concentrate both parallel rays of light and diffuse light to an exit aperture, substantially loose the tracking accuracy required for concentration, and dramatically reduce the cost of the solar concentrator, and further easily combine with a photovoltaic receiver or heat exchanger to form a concentrating photovoltaic or solar thermal system, in addition, be filled with the alternative gases helium and hydrogen to float in air.

SUMMARY

According to the present invention, an inflatable non-imaging optical system is provided to concentrate both parallel rays of light and diffuse light to an exit of aperture, substantially reduce the tracking accuracy required for solar concentration, and dramatically reduce the cost of solar systems. The embodiment of the invention is an assembly of at least two clear membranes and one reflective membrane. The assembly of the reflective membrane with one of the clear membranes on the top and one of the clear membranes on the bottom is inflated into a Compound Parabolic Concentrator (CPC). The incident light including both of parallel rays of light and diffuse light penetrating through the top transparent cover is concentrated to the exit aperture on the transparent bottom. For CPC concentrator, as long as the incident light falls into the half acceptance angle of the CPC, the incident light will be concentrated to the bottom exit aperture, therefore the accuracy of the tracking system required for the concentration system is released to the half acceptance angle of the CPC. As the sunlight concentrated by the CPC comes out the bottom exit aperture of the CPC, it is easy to integrate a photovoltaic receiver or heat exchanger into the assembly of the CPC and form a concentrating photovoltaic or solar thermal system. In addition, instead of air, the lighter gases helium and hydrogen can be filled into the concentrator to have it float in the air.

Further aspects and advantages of the present invention will become apparent upon consideration of the following description thereof, reference being made of the following drawing.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
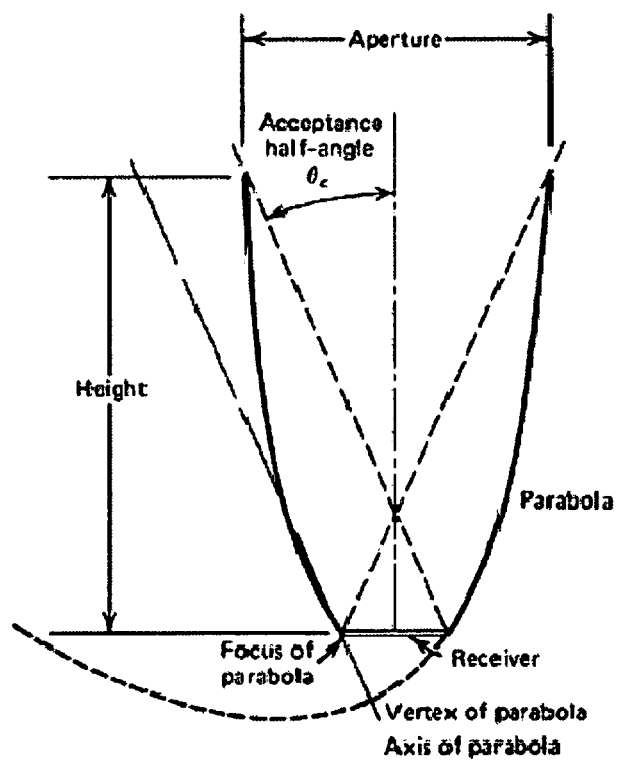
FIG. 1 shows the prior art a schematic drawing on construction of the CPC concentrator, which introduces some key concepts such as acceptance half-angle $\theta_c$, focus of each of the parabolas, concentrator aperture, receiver, and axis of parabola.

Referring to FIG. 1, the prior art, a schematic drawing on construction of the CPC concentrator, which introduces some key concepts such as acceptance half-angle $\theta_c$, focus of each of the parabolas, concentrator aperture, receiver, and axis of parabola. The incident light, no matter beam light or diffuse light, as long as falling into the acceptance half-angle $\theta_c$, will be concentrated to the receiver.

Figure 2:
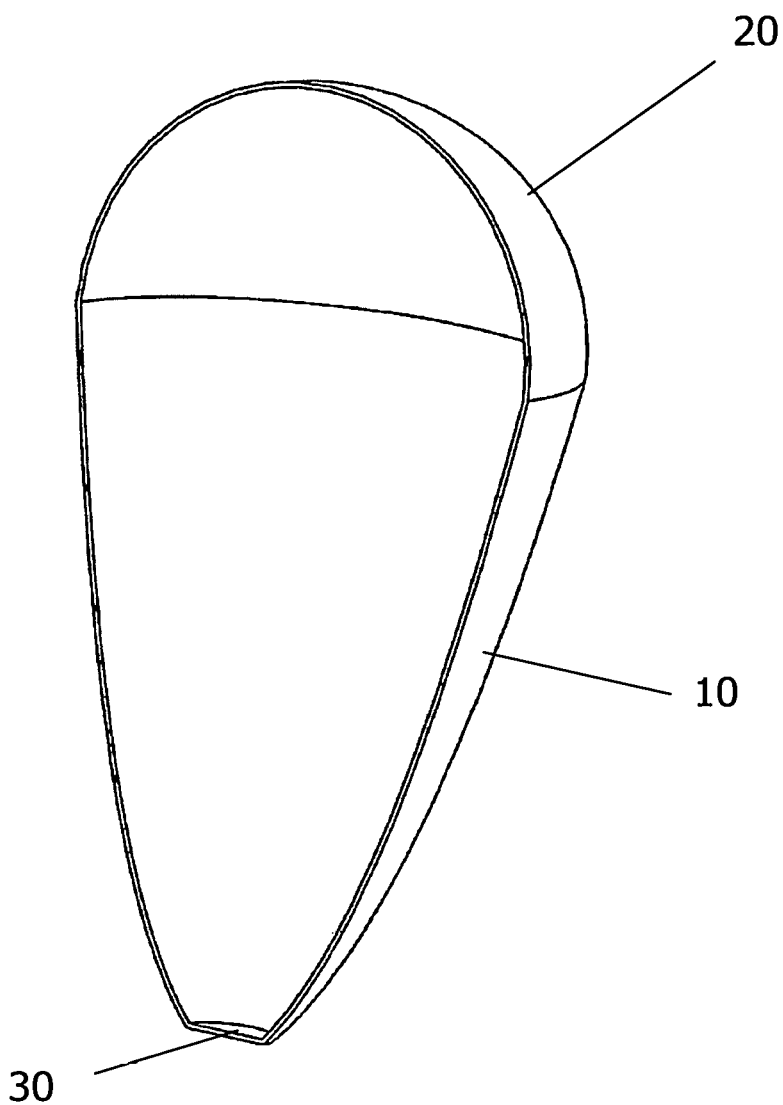
FIG. 2 is a schematic drawing of the inflatable non-imaging concentrator the assembly of two clear membranes and a reflective membrane inflated into a CPC with a transparent cover on top and a transparent cover on bottom.

Referring to FIG. 2, the CPC 10 made of reflective membrane is covered with a transparent cover 20 on the top and covered with a transparent cover 30 on the bottom to form a sealed assembly with a gas gate on the top transparent cover. Then the assembly is inflated into a shape of CPC covered with clear top and bottom.

If the enclosed apparatus is filled with air and equipped with a solar tracker, the tracking accuracy required for concentration is significantly reduced. When the concentrator is in operation, the incident light penetrating through the top transparent cover 20 will be concentrated by the CPC 10 and output through the bottom transparent cover 30.

If the enclosed apparatus is filled with gases such as helium and hydrogen, it will float in the air and some light tracking system could be employed to concentrate the sunlight.

From the description above, a number of advantages of the solar concentrator become evident. The inflatable apparatus provides an approach to realize an ultra-light, exclusively cheap, extremely compact solar concentrator. The concentrator is able to concentrate both beam and diffuse light. The non-imaging CPC concentrator looses the tracking accuracy required for solar concentration. The inflatable non-imaging balloon type concentrator has higher tolerance to shape distortion than imaging concentrator. The combination of the inflatable non-imaging balloon type concentrator and the photovoltaic receiver or heat exchanger makes super-light and extremely low cost concentrating photovoltaic system or solar thermal system. The close structure of the concentrator enables the filling of the lighter than air helium and hydrogen and floating in the air.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. An inflatable non-imaging Compound Parabolic Concentrator (CPC) solar concentrator comprising: a revolved close structure hollow core shell funnel shaped body having, a CPC portion of the body, a round solar energy entrance aperture of the CPC, a round solar energy exit aperture of the CPC; a domed transparent cover with a round circumference; a flat transparent cover with a round circumference;

wherein, the domed transparent cover is covered on the entrance aperture with the circumference of the domed transparent cover overlapped with the circumference of the entrance aperture and connected, the flat transparent cover is covered on the exit aperture with the circumference of the flat transparent cover overlapped with the circumference of the exit aperture and connected, to form a sealed gas chamber with a closed structure which can be made of thin and non-rigid materials without fasten structure but still maintain sufficient mechanical strength to against wind load and keep its geometric shape to concentrate light;

wherein, the inner surface of the CPC portion of the revolved close structure hollow core shell funnel shaped body is made reflective to solar radiation by coating a reflective materials reflector;

wherein, the transverse profile curves of the CPC portion of the revolved close structure hollow core shell funnel shaped body are two parabolas which form concave reflecting and guiding side surface means;

At least one membrane with at least one side coated with reflective materials is tailed and sealed to form the revolved funnel shaped body, at least two transparent membranes are tailed to form the domed transparent cover and the flat transparent cover, and the revolved CPC funnel shaped body and the domed transparent cover and the flat transparent cover are sealed together to form the sealed gas chamber, the sealed gas chamber is inflated into the inflatable non-imaging revolved funnel shaped CPC solar concentrator, rather than the longitudinally-extending trough-shaped CPC, by the gas pressure difference between the inside and environment of the gas chamber;

wherein, the outline of the cross section of the gas chamber is not conical but parabolic as the transverse profile curve of CPC non-imaging concentrator.

2. The inflatable non-imaging Compound Parabolic Concentrator (CPC) solar concentrator of claim 1, wherein the wall of the CPC portion of the sealed gas chamber and the solar radiation reflector coated on the inner surface of the CPC portion of the sealed gas chamber are a single entity.

* * * * *